(12) United States Patent
Su et al.

(10) Patent No.: US 6,585,882 B1
(45) Date of Patent: *Jul. 1, 2003

(54) METHOD AND APPARATUS FOR TREATMENT OF GAS BY HYDROTHERMAL ELECTROLYSIS

(75) Inventors: Qingquan Su, Kanagawa (JP); Roberto Masahiro Serikawa, Kanagawa (JP); Masahiro Isaka, Kanagawa (JP); Tatsuya Nishimura, Kanagawa (JP); Yoko Kubota, Chiba (JP)

(73) Assignee: Ebara Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/913,264
(22) PCT Filed: Feb. 10, 2000
(86) PCT No.: PCT/JP00/00745
§ 371 (c)(1),
(2), (4) Date: Aug. 10, 2001
(87) PCT Pub. No.: WO00/47308
PCT Pub. Date: Aug. 17, 2000

(30) Foreign Application Priority Data

Feb. 10, 1999 (JP) ............................................. 11-032349
Feb. 10, 1999 (JP) ............................................. 11-033026

(51) Int. Cl.⁷ ................................................ C02F 1/461
(52) U.S. Cl. ........................ 205/687; 205/688; 205/701; 205/742; 205/763; 588/204; 204/242; 204/275.1; 204/277; 204/278
(58) Field of Search ................................. 205/687, 688, 205/701, 742, 763; 204/242, 275.1, 277, 278; 588/204

(56) References Cited

U.S. PATENT DOCUMENTS

| 4,389,288 A | 6/1983 | Vaughan |
| 4,405,420 A | 9/1983 | Vaughan |
| 4,416,956 A | 11/1983 | Lawless |

(List continued on next page.)

FOREIGN PATENT DOCUMENTS

| DE | 296 02 047 | 3/1996 |
| EP | 0 535 320 | 4/1993 |
| FR | 2 780 986 | 1/2000 |

(List continued on next page.)

OTHER PUBLICATIONS

Kreysa, G. "Elektrochemische Umwelttechnik", Chemie. Ingenieur. Technik, Verlag Chemie GMBH., Weinheim, DE, vol. 62, No. 5, May 1, 1990, pp. 357–365.

(List continued on next page.)

Primary Examiner—Arun S. Phasge
(74) Attorney, Agent, or Firm—Wenderoth, Lind & Ponack, L.L.P.

(57) ABSTRACT

An object of the present invention is to provide a process and an apparatus for treating a gas containing reducing substances to efficiently degrade and remove the reducing substances. As a means to achieve this object, the present invention provides a process for treating a gas containing reducing substances by hydrothermal electrolysis, comprising supplying a gas containing reducing substances into a reactor charged with an aqueous medium containing a halide ion under application of a direct current at a temperature of 100° C. or more but the critical temperature of said aqueous medium or less and at a pressure that allows said aqueous medium to be kept in the liquid phase.

25 Claims, 3 Drawing Sheets

U.S. PATENT DOCUMENTS 4,752,364 A 6/1988 Dhooge
6,348,143 B1 * 2/2002 Serikawa et al. ........... 205/687

FOREIGN PATENT DOCUMENTS

| JP | 52-32442 | 3/1977 |
| JP | 5-220344 | 8/1993 |
| JP | 9-206796 | 8/1997 |
| JP | 9-215982 | 8/1997 |
| WO | 99/07641 | 2/1999 |

OTHER PUBLICATIONS

Database WPI, Section Ch, Week 198332, Derwent Publications Ltd., London, GB; AN 1983–733133 XP002203345 & SU 962 212 A (Khark Rail Transpt), Sep. 30, 1982, *Abstract*.

Microfilm of the specification and drawings annexed to the request of the Japanese Utility Model Application No. 183287/1985 (Laid–open No. 90730/1987) (Mitsubishi Heavy Industries, Ltd.), Jun. 10, 1987, claims of utility model.

* cited by examiner

METHOD AND APPARATUS FOR TREATMENT OF GAS BY HYDROTHERMAL ELECTROLYSIS

This application is a 371 application of PCT/J00/000745 filed on Feb. 10, 2000.

FIELD OF THE INVENTION

The present invention relates to processes and apparatus for treating a gas containing reducing substances such as malodorants or pollutants by performing hydrothermal reaction and electrolytic reaction. Combination of hydrothermal reaction and electrolysis is herein referred to as hydrothermal electrolysis. Gases that are treated by processes of the present invention (influent gases) include gaseous materials containing reducing substances such as low-molecular weight organics, volatile organic halogen compounds, ammonia, hydrogen sulfide and cyanide gases with the balance being nitrogen, argon, air and oxygen. The present invention relates to processes and apparatus for converting reducing substances contained in said influent gases into harmless components such as carbon dioxide gas, nitrogen gas, sulfide ion, chloride ion or the like.

PRIOR ART

Gases containing reducing substances have been conventionally treated by gas phase catalytic oxidation, activated carbon adsorption, UV oxidation, etc. Gas phase catalytic oxidation involves mixing a gas containing reducing substances with an oxidizer such as air and bringing said mixture into contact with a catalyst under conditions of almost normal pressure and 160–300° C. to oxidatively degrade malodorous components into carbon dioxide gas, nitrogen and water, whereby various malodorous components such as ammonia, low-molecular weight amines, mercaptans and aldehydes can be treated. However, this gas phase catalytic oxidation often suffers from a local temperature rise in the catalytic layer caused by autogenous combustion when the gas contains a lot of reducing substances. If the untreated gas contains a nitrogen compound (ammonia, amines, etc.), such a local temperature rise produces a high NOx fuel gas. If the gas contains reducing substances containing sulfur in the molecule, SOx may be produced. If the influent gas contains an organic halogen compound, a halic acid is produced in the catalytic layer. Once a halic acid is produced, the catalyst is readily poisoned. The catalyst is also often poisoned when the influent gas contains a dust component such as phosphorous compounds, sulfur compounds, silica. Especially, noble metal catalysts are more liable to be poisoned. Even when reducing substances free from these heteroatoms such as low-molecular weight hydrocarbons are treated by gas phase catalytic oxidation, incomplete combustion products such as CO gas may be produced under some process conditions. In order to advance complete oxidative degradation in catalytic oxidation, the temperature of the catalytic layer must be strictly controlled. If the temperature is too high, the catalyst may be deteriorated or NOx may be produced. If the temperature is too low, however, reducing substances remain undegraded in the effluent gas. Therefore, it is very difficult to treat some kinds or levels of reducing substances contained in the influent gas by catalytic oxidation.

Activated carbon adsorption involves retaining reducing substances in pores of activated carbon by physical or chemical adsorption. Activated carbon adsorption typically takes place at normal temperature and pressure. Needless to say, reducing substances adsorbed to activated carbon must be further treated by burning or other means. When the molecular size of reducing substances is not suited to the pore diameter of activated carbon or reducing substances have no functional group suitable to be adsorbed, any adsorptive effect may not be produced for smoothly advancing the treatment of the gas. When the gas contains water or dust, adsorptive ability may be greatly lowered. When the influent gas contains reducing substances at high concentrations, a large amount of activated carbon is needed so that the cost for regenerating or treating such a large amount of activated carbon rises.

UV oxidation involves mixing a gas containing reducing substances with air and irradiating said mixture with UV rays to make the mineralization of the reducing substances into carbon dioxide gas or the like by accelerating a radical chain reaction. When a bond that absorbs a specific UV wavelength exists in reducing substance molecules, UV oxidation allows efficient degradation because radical reactions are readily chained. Especially when the gas contains such a component as trichloroethylene, UV oxidation is sometimes effective. However, reducing substances must be contained at relatively high concentrations in the influent gas to improve the chain reaction because the reaction proceeds by a radical chain reaction in this UV oxidation. When organochlorine compounds are to be treated, a special care is required about by-products such as dioxin because main degradative reaction is a radical reaction. Even if target reducing substances are effectively degraded, they are not always degraded into harmless inorganic components such as carbon dioxide gas but high concentrations of carbon monoxide or the like may be produced as a by-product.

In this way, processes of the prior art for treating a gas containing various reducing substances still have problems.

DISCLOSURE OF THE INVENTION

As a result of careful studies to overcome the above problems to find a process capable of efficiently degrading a gas containing various reducing substances, we accomplished the present invention on the basis of the finding that various reducing substances can be efficiently degraded by treating the gas by the hydrothermal electrolytic process.

We previously filed a patent application based on the finding that an aqueous medium containing reducing substances can be treated to efficiently degrade the reducing substances while inhibiting generation of hydrogen gas and oxygen gas by performing hydrothermal reaction and electrolytic reaction at the same time under predetermined conditions (hydrothermal electrolytic reaction) (International Patent Application PCT/JP 98/03544; International Publication WO99/07641). The disclosure of International Application PCT/JP 98/03544 is incorporated herein as a whole as reference. As a result of later studies, we accomplished the present invention on the basis of the finding that this hydrothermal electrolytic reaction process can be applied to the treatment of a gas containing reducing substances to degrade and remove the reducing substances in the gas.

Accordingly, an aspect of the present invention provides a process for treating a gas containing reducing substances by hydrothermal electrolysis, comprising supplying a gas containing reducing substances into a reactor charged with an aqueous medium containing a halide ion under application of a direct current at a temperature of 100° C. or more but not more than the critical temperature of said aqueous medium and at a pressure that allows said aqueous medium to be kept in the liquid phase.

The present invention also provides an apparatus for performing the process described above, ie, an apparatus for treating a gas containing reducing substances by hydrothermal electrolysis, comprising a reactor having an inlet for introducing the gas containing reducing substances and an outlet for discharging the effluent gas and capable of resisting the pressure of hydrothermal reaction, and a pair of electrodes for performing electrolysis in said reactor.

In the present invention, an aqueous medium containing a halide ion such as chloride ion is mixed with a gas containing reducing substances and the mixture is electrolytically reacted at predetermined high temperature and high pressure to oxidatively degrade the reducing substances. In electrolysis, oxidation reaction proceeds at the anode to produce oxygen gas or a halogen-based oxidizer such as a hypohalous acid. Generally, oxidation reaction readily proceeds in the presence of an oxidizer such as oxygen gas at high temperature and high pressure of hydrothermal reaction. In the present invention, reducing substances such as organics and ammonia can be effectively oxidatively degraded by performing hydrothermal reaction and electrolysis at the same time.

Electrode reactions that can proceed in hydrothermal electrolysis of the present invention are described below. At the anode, reactions (1), (2), (3) below seem to proceed.

$$2X^- \rightarrow X_2 + 2e^- \quad (1)$$

where X represents a chlorine atom, bromine atom or iodine atom or any combination thereof.

$$H_2O \rightarrow 2H^+ + \tfrac{1}{2}O_2\uparrow + 2e^- \quad (2)$$

$$Organic + H_2O \rightarrow CO_2\uparrow + H^+ + e^- \quad (3)$$

In formula (1), a halide ion is oxidized to produce a halogen molecule. When X is a chlorine atom, for example, chlorine gas is produced. In formula (2), water is electrolyzed to produce oxygen gas. In formula (3), an organic is directly oxidized at the anode. The reaction of formula (1) and the reaction of formula (2) compete with each other and which reaction prevails depends on the type of the anode, the halide ion concentration in the aqueous medium and other factors. For example, the reaction of formula (1) prevails when a chlorine-generating electrode is used at a specific halide ion concentration or more.

The halogen molecule produced at the interface between the anode and the electrolyte by formula (1) reacts with its neighboring water to produce a hypohalous acid and a hydrogen halide.

$$X_2 + H_2O \rightarrow HX + HXO \quad (4)$$

where X has the meaning as defined above.

Hypohalous acids are excellent oxidizers capable of oxidatively degrading reducing substances contained in aqueous media. When the reducing substance is an organic, for example, the organic seems to be oxidized by the reaction below.

$$Organic + HXO \rightarrow CO_2\uparrow + H_2O + HX \quad (5)$$

where X has the meaning as defined above.

When the reducing substance is ammonia, ammonia seems to be oxidized by the reaction below.

$$2NH_3 + 3HXO \rightarrow N_2\uparrow + 3HX + 3H_2O \quad (6)$$

Hypohalous acids are excellent oxidizers especially in acidic solutions and hydrogen ion is produced by formulae (2), (3), (4) or the like to tend to form an acidic environment near the anode at which a hypohalous acid is produced. Thus, the hypohalous acid seems to especially favorably act as an oxidizer near the anode.

When X is a chlorine atom, the oxidation reaction by the hypohalous acid seems to especially participate in the degradation of reducing substances.

When X is a bromine atom or an iodine atom, the halate ion may participate in the degradation of reducing substances. Hypohalite ions disproportionate in basic solutions to produce a halate ion and a halide ion.

$$3XO^- \rightarrow 2X^- + XO_3^- \quad (7)$$

For example, the reaction of formula (7) may occur when the hypohalous acid moves toward the cathode by diffusion or the like. This is because hydroxide ion is produced by anodic reaction to tend to form a basic environment near the cathode. The rate of the disproportionation reaction of formula (7) is higher in the order of chlorine, bromine and iodine, and a halate ion can be quantitatively obtained with bromine and iodine (F. A. Cotton, G. Wilkinson, P. L. Gaus, "Basic Inorganic Chemistry", Baifukan, 1991, 2nd ed., p. 379). Halic acids are strong acids and potent oxidizers.

In formula (2), oxygen gas is produced by the electrolysis of water. Here, an oxygen atom seems to be first produced at the interface between the anode and the electrolyte. Said oxygen atom has a higher activity as an oxidizer than molecular oxygen so that it can efficiently oxidize reducing substances. Even if molecular oxygen is produced, reducing substances can be oxidized by hydrothermal oxidation reaction.

When the reducing substance is an organic, oxidation reaction by oxygen proceeds by the formula below.

$$Organic + O_2 \rightarrow CO_2\uparrow + H_2O \quad (8)$$

As shown by formula (3), reducing substances such as organics or ammonia may be directly oxidized at the anode by electrode reaction. When the reducing substance is ammonia, for example, the reaction of the formula below may proceed.

$$2NH_3 \rightarrow N_2\uparrow + 6H^+ + 6e^- \quad (9)$$

Thus, hydrothermal electrolysis according to the present invention includes many reaction mechanism by which reducing substances are efficiently oxidatively degraded at or near the anode.

On the other hand, possible reactions at the cathode are as follows.

Water is electrolyzed to produce hydrogen at the cathode.

$$2H_2O + 2e^- \rightarrow H_2\uparrow + 2OH^- \quad (10)$$

Here, the so-called cathodic protection against corrosion can be provided by using the reactor body as cathode.

A reaction may also proceed in which an oxidizer is reduced at the cathode. The oxidizer here includes an oxidizer produced at the anode such as a hypohalous acid and optionally an externally added oxidizer. Examples of reaction are shown by formulae (11), (12) and (13) below.

The hypohalous acid is reduced at the cathode.

$$HXO + e^- \rightarrow X^- + OH^- \quad (11)$$

Oxygen dissolved in the aqueous medium represented by $O_2(aq)$ in the formulae below is also reduced.

$$\tfrac{1}{2}O_2(aq) + H_2O + 2e^- \rightarrow 2OH^- \quad (12)$$

The following reaction would possibly occur as another reduction reaction of dissolved oxygen at cathode.

$$O_2(aq)+2H_2O+2e^- \rightarrow H_2O_2(\text{active oxygen})+2OH^- \quad (13)$$

At the cathode, the reactions of formulae (11), (12) and (13) in which an oxidizer is reduced compete with the reaction of formula (10) in which hydrogen is generated.

Our experiments revealed that the reactions of formulae (11), (12), (13) or the like in which an oxidizer is reduced proceed preferentially to the reaction in which hydrogen is generated in hydrothermal electrolysis. Correspondingly, hydrogen generation is inhibited in hydrothermal electrolysis to reduce the possibility of coexistence of oxygen gas and hydrogen gas in the reactor and thus to reduce the danger of explosion. The oxidizer such as a hypohalous acid is degraded at the cathode to eliminate the secondary treatment for detoxifying the oxidizer in the effluent. For example, a hypohalite ion is generated at a high concentration during electrolysis at room temperature. However, the generation of a hypohalite ion was scarcely detected during electrolysis at high temperature.

Irrespective of the reaction mechanism, reducing substances such as organics and ammonia can be oxidatively degraded while inhibiting generation of hydrogen gas or oxygen gas according to the present invention.

Reducing substances that can be degraded/treated by the present invention include low-molecular weight organics such as methane, ethane, propane, butane, methyl mercaptan, acetaldehyde; volatile organic halogen compounds such as trichloroethane, trichloroethylene, chloroform, various chlorofluorocarbons; ammonia; hydrogen sulfide; cyanide gases; etc.

In the present invention, reducing substances in the influent gas are basically thought to be dissolved in an aqueous medium and then electrolyzed in the aqueous medium.

In the present invention, hydrothermal reaction takes place at a temperature of 100° C. or more but not more than the critical temperature of the aqueous medium and at a pressure that allows said aqueous medium to be kept in the liquid phase. Temperatures lower than 100° C. are not preferred because the rate of hydrothermal reaction is lowered to extend the reaction time. However, the finding of the present invention cannot be directly applied for temperatures higher than the critical temperature because physical properties of aqueous medium significantly change. At the supercritical state, for example, the solubility of the electrolyte such as a halide ion greatly decreases and electric conductivity is decreased.

In the present invention, the hydrothermal electrolytic reaction temperature is preferably 120–370° C., more preferably 140–370° C.

In the present invention, said aqueous medium preferably contains a halide ion. The halide ion serves as a catalyst in the hydrothermal electrolytic reaction so that degradative reaction proceeds more effectively. When the influent gas contains an organic halide, the same catalytic effect is obtained.

Such halide ions include chloride ion ($Cl^-$), bromide ion ($Br^-$), iodide ion ($I^-$) or any combination thereof, among which chloride ion or bromide ion is especially preferred. A halide ion-producing salt may be dissolved in the aqueous medium. An acid such as hydrogen chloride (HCl), hydrogen bromide (HBr) or hydrogen iodide (HI) may be contained in the aqueous medium.

The halide ion-producing salt may be an inorganic or organic salt. For example, a salt of an acid such as hydrogen chloride (HCl), hydrogen bromide (HBr) or hydrogen iodide (HI) with a base is preferably used. Inorganic salts include, for example, alkali metal halides such as sodium chloride, potassium chloride; alkali earth metal halide such as calcium chloride; ammonium halides such as ammonium chloride; and complex salts such as tris(ethylenediamine) cobalt (III) chloride, tris(2,2'-bipyridine) iron (II) bromide. Organic salts include tetraalkylammonium halides such as tetraethylammonium chloride. Addition salts of amines and hydrogen halides (eg, aniline/hydrogen chloride) are also suitable. Exhaust gas from underground water treatment plants often contains organic halides such as trichloroethylene.

The aqueous medium preferably contains 0.05 mmol/l or more of a halide ion, more preferably 0.5 mmol/l or more of a halide ion, most preferably 5 mmol/l or more of a halide ion. This is because the halide ion produces a hypohalous acid via the electrolysis of the aqueous medium to oxidize reducing substances in the aqueous medium.

The aqueous medium preferably contains 0.05 mmol/l or more of chloride ion ($Cl^-$), more preferably 0.5 mmol/l or more of chloride ion, most preferably 5 mmol/l or more of chloride ion.

More preferably, the reaction system contains an oxidizer so that active oxygen or the like are also generated at the cathode to further accelerate degradative reaction. This oxidizer source may be oxygen contained in the influent gas, and if it is insufficient, an external oxidizer may be added to inhibit hydrogen generation and thus avoid formation of an explosive mixed gas. Oxidizers that can be externally added for this purpose are preferably oxygen gas, ozone gas, hydrogen peroxide and hypohalous acids, more preferably oxygen gas. Oxygen gas may be a gas containing oxygen gas, eg, air is preferably used.

When an oxidizer is externally added in the present invention, the dose of the oxidizer is preferably in the range of 0.01–100 equivalents of the amount necessary to completely oxidize reducing substances contained in the influent gas. If the oxidizer dose is less than 0.01 equivalents, the electric costs rise because the oxidizer must be wholly electrically generated. If the oxidizer dose is more than 100 equivalents, however, energy is wastefully consumed to pressurize an excessive oxidizer.

When the gas to be treated is acidic, reducing substances can be dissolved in an aqueous medium in the reactor by adding an alkali to the aqueous medium so that the reducing substances can be effectively degraded by hydrothermal electrolysis. When the gas to be treated is basic, however, reducing substances can be dissolved in an aqueous medium in the reactor by adding an acid to the aqueous medium so that the reducing substances can be effectively degraded by hydrothermal electrolysis. The expression "acidic" or "basic" as referred to a gas herein is used to designate a gas showing a pH lower or higher than 7, respectively, when dissolved in water.

Even if reducing substances are not initially contained in a gas, they can be treated by this process by concentrating and transferring the reducing substances in the liquid medium to a gas by aeration, distillation, stripping or other means. Thus, the process of the present invention can be used to treat a liquid medium containing reducing substances. It is normally more advantageous in terms of energy to heat a gas than to heat a liquid to hydrothermal reaction conditions because the specific heat of gas is far lower than the specific heat of water. Therefore, it is sometimes economically more advantageous to once transfer reducing substances contained in a liquid medium into a gas and then treat them by hydrothermal electrolysis rather than to directly treat the liquid medium by hydrothermal electrolysis. This is especially the case with low-molecular weight reducing substances and volatile reducing substances or reducing substances that can be readily transferred from an aqueous solution to a gas phase. However, this is not the case with reducing substances that cannot be readily transferred to a gas phase such as high-molecular weight substances because enormous energy is required to transfer them into a gas phase.

A second aspect of the present invention provides an apparatus for smoothly performing this process for treating a gas by hydrothermal electrolysis.

THE MOST PREFERRED EMBODIMENTS OF THE INVENTION

Figure 1:
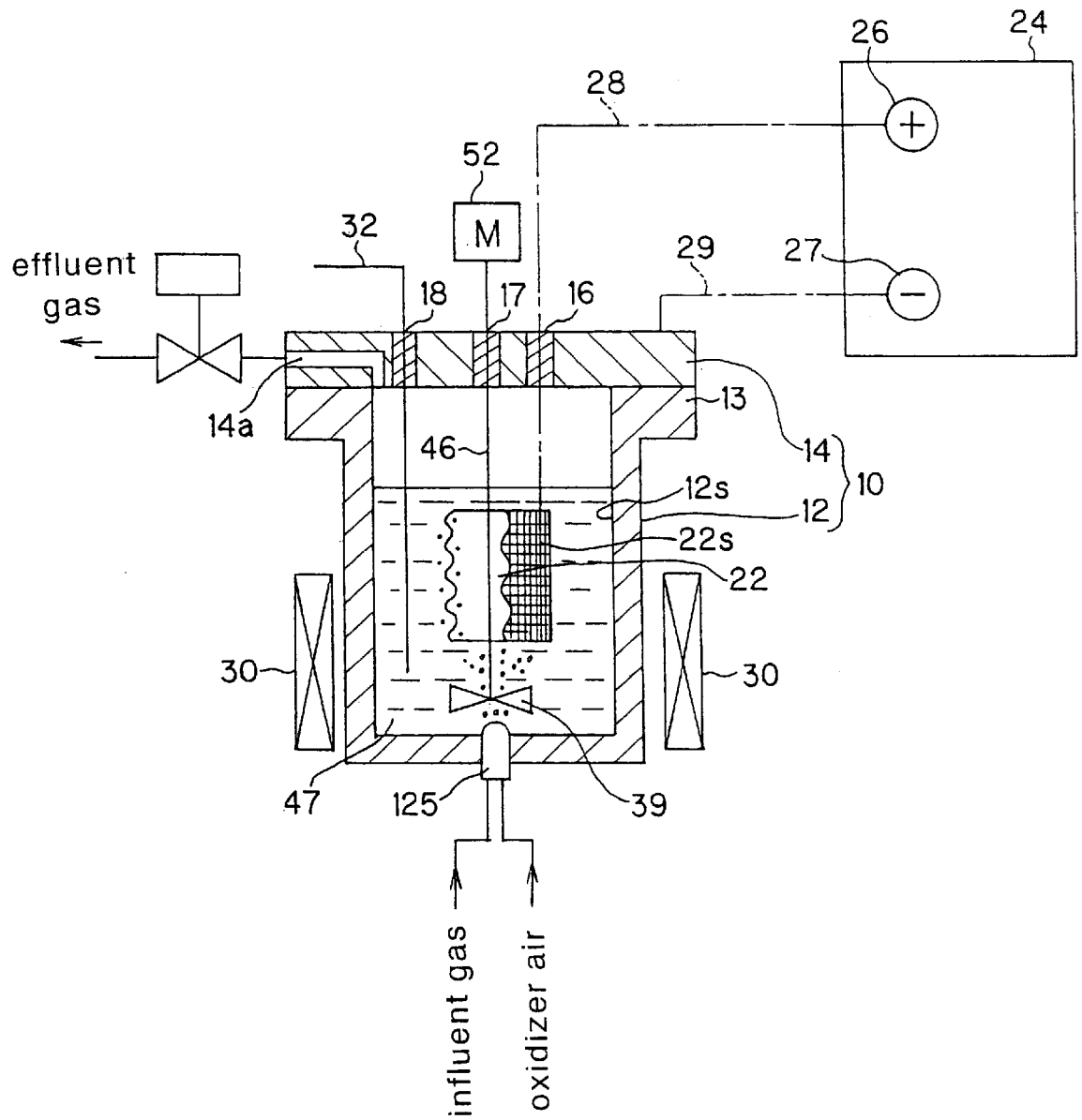
FIG. 1 is a schematic view showing the concept of a hydrothermal electrolytic reactor according to the present invention.

Hydrothermal electrolytic reaction of the present invention is explained with reference to FIG. 1. FIG. 1 is a schematic view of an embodiment of a hydrothermal electrolytic reactor for performing hydrothermal electrolytic reaction according to the present invention.

The hydrothermal electrolytic reactor comprises a reactor 10 capable of resisting the pressure of hydrothermal reaction, and reactor 10 has a body 12 capable of holding aqueous medium 47 and a cover 14. A flange 13 is provided at the top of body 12. Flange 13 of body 12 and an end of cover 14 can be joined with a fastener not shown, eg, a bolt and a nut. Reactor 10 can consist of an autoclave, for example. Reactor 10 can resist the pressure of hydrothermal reaction to form a closed space.

A pair of electrodes for electrolysis are provided in reactor 10. Body 12 of reactor 10 has a metal inner wall 12s, which can serve as a cathode. For example, body 12 may be wholly made from a metal, as shown in FIG. 1. In this case, inner wall 12s of body 12 can be protected against corrosion. If a cathode is provided separately from body 12, inner wall 12s of body 12 is susceptible to corrosion by a halide ion such as chloride ion at high temperature and high pressure of hydrothermal reaction.

Body 12 can be made from nickel-based alloys such as Hastelloy, Inconel, Incoloy; titanium-based alloys; steels such as carbon steel, stainless steel. However, inner wall 12s of body 12 may be covered with a coating layer of a metal such as platinum serving as a cathode.

An anode 22 is also provided in body 12 of reactor 10. The shape of the anode is not limited in principle.

In the present invention, the distance between the anode and the cathode is preferably equal. If this distance varies, an excessive current flows locally at narrow regions to accelerate deterioration of the anode at those regions. In the present invention, inner wall 12s of body 12 preferably has a cylindrical shape. Preferably, outer face 22s of anode 22 also has a cylindrical shape so that the center axis of anode 22 substantially coincides with the center axis of inner wall 12s of body 12.

Anode 22 may be a cylindrically shaped mesh or net or a cylindrically shaped plate.

Preferably, the electrode capable of functioning as an anode has a surface having ruthenium, iridium, platinum, palladium, rhodium, tin or an oxide thereof or a ferrite. For example, the electrode itself may be made from these materials. Alternatively, the base material of the electrode may be coated with these materials on the surface.

Ruthenium, iridium, platinum, palladium, rhodium and tin may be elemental metals or oxides. Alloys of these metals are also preferably used. Such alloys include, for example, platinum-iridium, ruthenium-tin and ruthenium-titanium. These metals show high corrosion resistance, excellent insolubility for use as an anode and high generation efficiency of a halogen molecule such as chlorine gas. Especially preferred chlorine-generating electrodes are based on palladium, ruthenium or an alloy of platinum and iridium.

Positive terminal 26 and negative terminal 27 of dc source 24 are connected to anode 22 and cathode 12s via lines 28, 29, respectively. Line 28 for feeding the anode passes through reactor 10, while line 28 is insulated from reactor 10 by insulating member 16. When body 12 and cover 14 are made from a metal, line 29 may be connected to body 12 or cover 14. The dc source may be derived from an ac current converted into a dc current using a full wave rectifier comprising a diode, condenser, resistor, etc.

A mixing nozzle 125 is provided in reactor 10, preferably at the bottom, and the influent gas and (in preferred embodiments) an oxidizer air are introduced into the reactor via said nozzle.

Reactor 10 is heated by heater 30. The heater may be an electric heater, for example. It may also be a bath of silicone oil or the like. If the reactor is in the form of a column, the reactor may be externally heated with a burner or the like.

The hydrothermal electrolytic reactor preferably has a thermocouple 32 for measuring the temperature of aqueous medium 47. The thermocouple may consist of, for example, a Chromel-alumel alloy or a platinum alloy. In FIG. 1, insulating member 18 is provided in cover 14 of reactor 10, and thermocouple 32 passes through insulating member 18. However, thermocouple 32 may directly passes through cover 14 without providing insulating member 18. A temperature control mechanism may be provided for controlling heater 32 on the basis of the reading of thermocouple 32.

Preferably, aqueous medium 47 is agitated with a stirrer, eg, impeller 39. Impeller 39 may have a rotation shaft in agreement with the center axis of reactor 10, for example.

Hydrothermal electrolytic reactor 10 has a line for discharging effluent gas. The effluent line communicates with the inside of reactor 10 via through-hole 14a formed in cover 14.

Next, a hydrothermal electrolytic process using the hydrothermal electrolytic apparatus shown in FIG. 1 is explained.

Reactor 10 holding an aqueous medium is heated to a predetermined temperature by heater 30. During then, the inner temperature of reactor 10 is preferably monitored by thermocouple 32. After the predetermined temperature is reached, an influent gas containing reducing substances is introduced via nozzle 125 under application of a current from dc source 24 across anode 22 and body 12 of reactor 10 serving as a cathode. During then, the inside of reactor 10 is kept under pressure. Preferably, the influent gas is introduced with an oxidizer air.

The influent gas and air discharged from nozzle 125 are in the form of small bubbles of several millimeters to several tens of micrometers because the inside of reactor 10 is kept under pressure. They are further atomized and mixed/agitated by a shearing force from the high-speed rotation of impeller 39. The impeller may be a type of centrifugal pump. Preferably, this impeller has a revolution speed in the range of 50–10,000 rpm. Below 50 rpm, atomization of bubble and mixing of the gas and air will not proceed smoothly. Above 10,000 rpm, mechanical problems will occur such as vortex, wear of rotary parts, frictional heat generation at bearings, etc. In the present invention, the impeller may be operated by rotating the stirring shaft using a direct drive system, but preferably a magnet drive system including a motor 52 as shown in FIG. 1. In addition to atomization of bubbles and mixing/stirring, this impeller also has the function of centrifugally pushing a gas between insertion electrode 22 and the reactor. Once a gas is atomized into bubbles, reducing substances contained in the gas are readily transferred to the aqueous medium to increase the solubility of malodorous components or the like. When the gas is acidic, reducing substances such as malodorous components are further dissolved into the aqueous medium having a basic pH. When the gas is basic, however, the aqueous medium is preferably acidic. Oxygen becomes more soluble for the aqueous medium by atomizing bubbles of air. The aqueous medium in which these reducing substances and oxygen are dissolved rises with bubbles between insertion electrode 22 and reactor inner wall 12s. Reducing substances dissolved in water are electrolyzed as they pass between insertion electrode 22 and reactor inner wall 22s serving as a cathode. At the anode, an elementary halogen ion or the like is electrochemically produced in the nascent state to make the mineralization of reducing substances dissolved in the aqueous medium. At the cathode, dissolved oxygen is converted into active oxygen or the like, which inorganizes reducing substances. Even when reducing substances are not completely dissolved in the aqueous medium, a part of the reducing substances in bubbles may be sometimes oxidatively degraded in the bubbles by directly reacting with these electrically generated oxidizers. In any way, degradative reaction proceeds more effectively as bubbles are finer.

The treated gas is discharged with air from outlet 14a.

Preferably, dc source 24 has a constant current rather than a constant voltage. As aqueous media are electrolyzed, the resistance of the aqueous media varies with various factors. The amount of the gas produced or the like can be controlled easier when the current is constant. Scale deposition in the reactor can be known by monitoring the voltage necessary for applying a constant current.

In the present invention, the current density at the anode is preferably 0.1 mA/dm$^2$–500 A/dm$^2$. If the current density is higher than 500 A/dm$^2$, the surface of the anode is liable to be exfoliated or dissolved. If the current density is lower than 0.1 mA/dm$^2$, however, the area of the anode must be increased and the system becomes bulky. The current density is more preferably 10 mA/dm$^2$–100 A/dm$^2$, most preferably 100 mA/dm$^2$–50 A/dm$^2$. If a new material for the anode is developed, the current density at the anode can be further increased.

Figure 2:
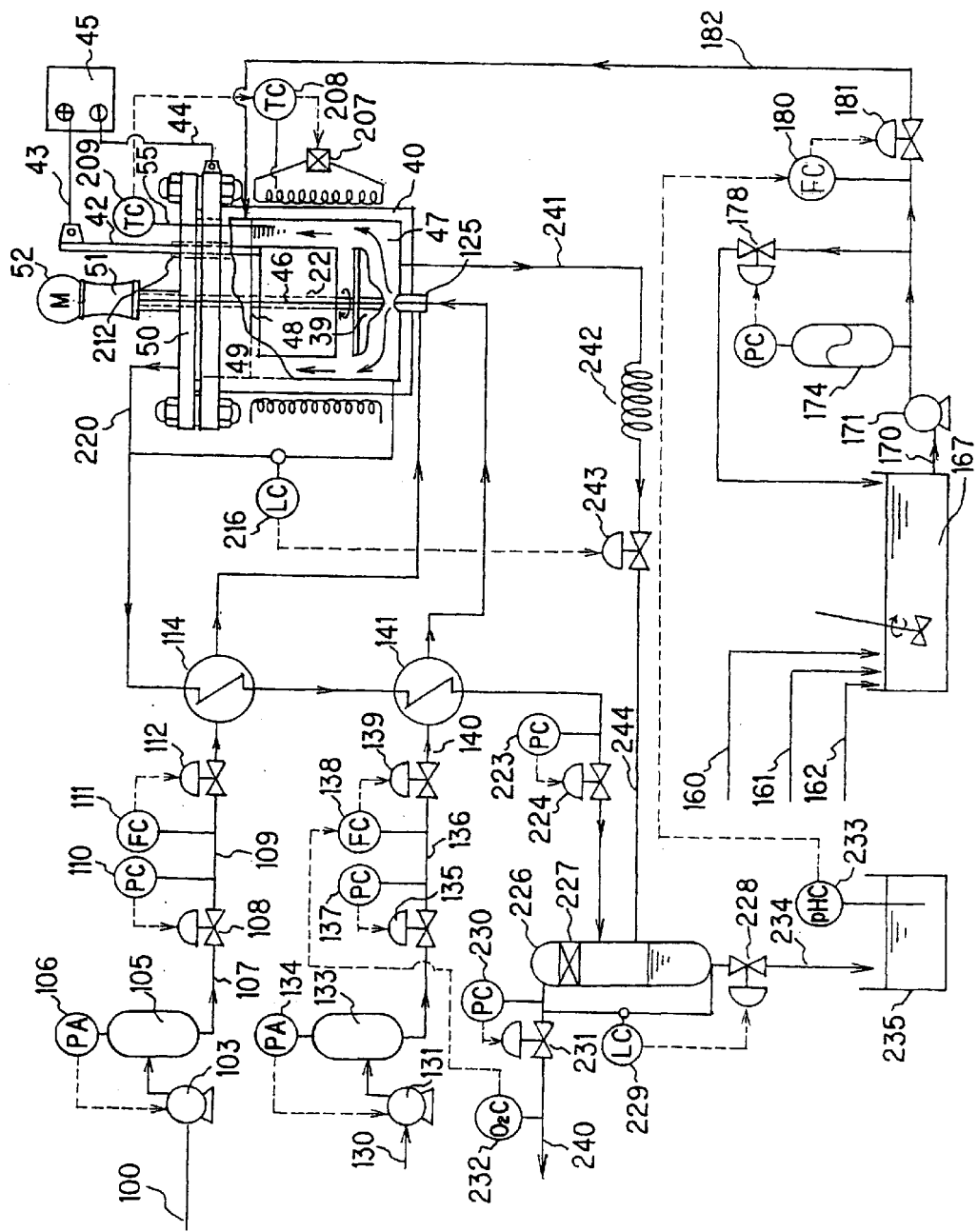
FIG. 2 shows an outline and a control diagram of an automatically controllable hydrothermal electrolytic reactor according to an embodiment of the present invention.
Figure 3:
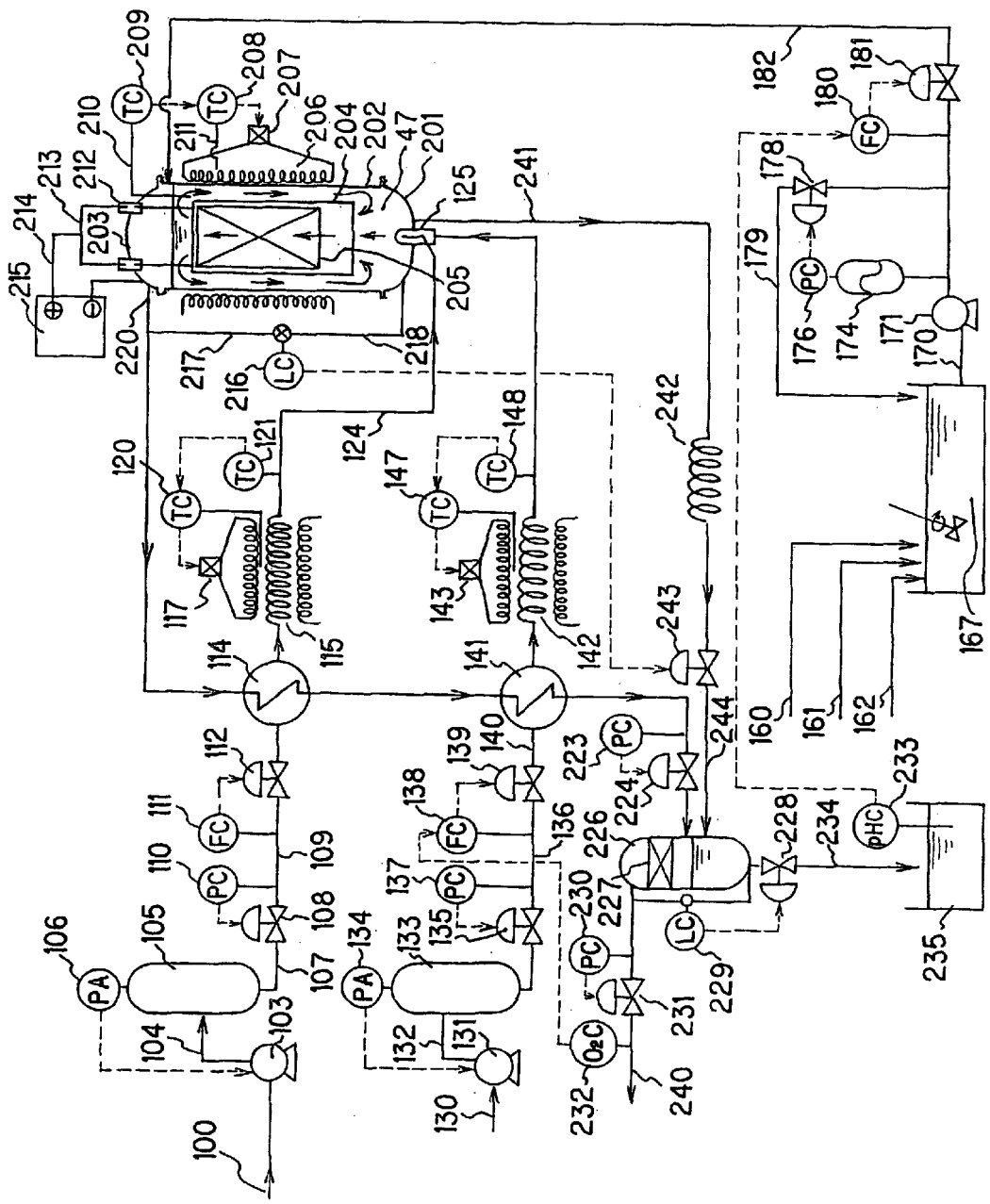
FIG. 3 shows an outline and a control diagram of an automatically controllable hydrothermal electrolytic reactor according to an embodiment of the present invention, which is suitable for treating a relatively high emission gas.

Next, a process for performing hydrothermal electrolysis of the present invention under automatic control is explained. FIG. 2 shows an apparatus capable of performing hydrothermal electrolysis of the present invention under automatic control. The apparatus shown in FIG. 2 is especially effective for treating a small amount of gas. A measure of the effective flow rate is 50 L/min or less. When the inflow rate is more than 50 L/min in the present invention, it is preferable to use the apparatus shown in FIG. 3 as described later. In FIGS. 2 and 3, various symbols represent the following elements: PA: pressure indicator; PC: pressure controller; FC: flow controller; TC: temperature controller; LC: liquid level controller; O$_2$C: oxygen level controller; EcC: Electric conductivity controller; pHC: pH controller. In FIGS. 2 and 3, various reference numbers represent the following elements: 10: hydrothermal electrolytic reactor; 22: electrode; 30: heater; 39: stirring impeller; 40: reactor body; 41: insertion electrode; 42: insertion electrode connection; 43: anode connection; 44: cathode connection; 45: dc source; 46: stirring shaft; 47: aqueous medium; 48: gas phase in the reactor; 49: liquid level; 50: reactor cover; 51: magnet for driving the stirring shaft; 52: motor for rotating the magnet; 53: electric heater; 55: thermocouple; 100: influent gas feed line; 103: high-pressure compressor; 105: gas accumulator; 106: pressure controller; 107: gas line; 108: gas secondary pressure control valve; 109: gas secondary pressure line; 110: secondary pressure controller; 111: flow controller; 112: flow control valve; 114: heat exchanger; 115: spiral heater; 117: thyristor controller; 120: heater temperature controller; 121: heater gas temperature controller; 124: gas line; 125: gas injection nozzle; 130: air feed line; 131: high-pressure compressor; 132: air line; 133: air accumulator; 134: pressure controller; 135: secondary pressure control valve; 136: secondary pressure line; 137: secondary pressure controller; 138: flow controller; 139: flow control valve; 140: air line; 141: heat exchanger; 142: spiral heater; 143: thyristor regulator; 147: heater temperature controller; 148: air temperature controller; 160: halide ion feed line; 161: acid or alkali aqueous solution feed line; 162: water source feed line; 167: aqueous medium conditioning tank; 170: high-pressure pump suction line; 171: high-pressure pump; 174: accumulator; 176: pressure controller; 178: aqueous medium relief control valve; 179: aqueous medium returning line; 180: aqueous medium flow controller; 181: aqueous medium flow control valve; 182: aqueous medium line; 201: reactor bottom cover; 202: reactor body; 203: reactor top cover; 204: insertion electrode; 205: insertion electrode filler; 206: electric heater; 207: thyristor regulator; 208: reactor heater temperature controller; 209: reactor inner temperature controller; 210: thermocouple; 212: insulating member; 213: insertion electrode connection; 214: anode connection; 215: dc source; 216: reactor liquid level controller; 217: liquid level controlling upper pressure transmitter tube; 218: liquid level controlling lower pressure transmitter tube; 220: reactor outlet for effluent gas; 223: reactor pressure controller; 224: reactor pressure control valve; 226: gas-liquid separator; 227: demister; 228: liquid level control valve; 229: liquid level controller; 230: gas-liquid separator pressure controller; 231: gas-liquid separator pressure control valve; 232: oxygen level controller; 233: pH controller; 234: effluent aqueous medium line; 235: effluent aqueous medium storing tank; 240: vent; 241: aqueous medium eduction line; 242: aqueous medium cooling part; 243: liquid level control valve; 244: aqueous medium line.

An aqueous medium forming a reaction medium in the present invention is preconditioned in conditioning tank 167. Into conditioning tank 167 are introduced water and an additive halide and optionally a pH controlling acid or alkali or the like via lines 160, 161, 162. The aqueous medium may be tap water, industrial water, hydrothermally electrolyzed water or the like without specifically limiting the water quality. Preferably, the aqueous medium is first conditioned at a halide ion level in the range of 5 mg/L–20 wt %. Preferably, the pH of the aqueous medium is controlled in tank 167 to suit the properties of the influent gas preliminarily known. When the influent gas is an acidic gas, the aqueous medium in conditioning tank 167 is preferably adjusted to a pH range of 7.5–13 with an alkali. When the influent gas is alkali, the aqueous medium in conditioning tank 167 is preferably adjusted to a pH range of 1–6.5 with an acid. The conditioned aqueous medium is sucked into high-pressure pump 171 via line 170. In high-pressure pump 171, the aqueous medium is pressurized to a pressure about 3 MPa higher than the reaction pressure. This pressure control is accomplished with pressure controller 176. That is, when the pressure exceeds the reaction pressure plus 3 MPa by pressurization in high-pressure pump 171, valve 178 moves to the open direction to lower the pressure. Thus, the pressure on the outlet side of the pump is always kept constant. Pressure variation in high-pressure pump 171 for pressurizing liquid can be absorbed by accumulator 174 holding a gas, so that smooth pressure control can be ensured by valve 178. This constant pressure on the outlet side of the pump is necessary for smooth operation of flow controller 180. In the present invention, the sensor of the flow controller may be either of an orifice type or a heat conduction type used in mass flow controllers, but may indicate an error value if the line including the flow sensor is not kept at a constant pressure. Flow controller 180 activates flow control valve 181 to circulate the aqueous medium through line 182 at a predetermined flow rate. The pressure in line 182 is reaction pressure. The aqueous medium is injected at the top of the reactor and mixed with the aqueous medium in the reactor.

A gas containing reducing substances is taken into the system of the present invention via 100. The gas is pressurized to a pressure higher than the reaction pressure in compressor 103 and transiently stored in accumulator 105. Preferably, accumulator 105 has a pressure sensor so that compressor 103 activates when the pressure in the accumulator drops to about the reaction pressure plus 1 MPa or less while the compressor stops when the pressure rises to the reaction pressure plus 3 MPa. Preferably, the pressure in accumulator 105 is always kept in the range of the reaction pressure plus 1 MPa to the reaction pressure plus 3 MPa under automatic control. Then, the gas is depressurized to about the reaction pressure plus 0.5 MPa at valve 108 via line 107. This reducing valve 108 is a secondary pressure control valve. The secondary pressure control valve may be a spring type or a pneumatically controlled valve having pressure sensor 110 as shown in FIG. 1. In either type, the primary side of valve 112 is preferably always kept at a constant pressure. A predetermined amount of the gas kept at a constant pressure in line 109 is injected into the reactor under the action of flow control valve 112. The sensor of flow controller 111 may be an orifice type or a mass flow controller. In the present invention, the flow control system is not specifically limited, but preferably adapted to inject a constant flow into the reactor. If a constant flow is not injected into the reactor, the amount of reducing substances injected into the reactor varies so that undegraded reducing substances may be discharged from the reactor. The gas having passed through the flow control valve is preheated in heat exchanger 114 and injected into mixing nozzle 125.

The gas is mixed with air containing an oxidizer in mixing nozzle 125 and injected into reactor 40.

The air used as an oxidizer is taken from line 130. Then, it is pressurized to a pressure about 3 MPa higher than the reaction pressure in compressor 131. The pressurized air is transiently stored in accumulator 133 equipped with pressure controller 134. Preferably, accumulator 133 has a pressure sensor so that compressor 131 activates when the pressure in the accumulator drops to about the reaction pressure plus 1 MPa or less while the compressor stops when the pressure rises to the reaction pressure plus 3 MPa. Preferably, the pressure in accumulator 133 is always kept in the range of the reaction pressure plus 1 MPa to the reaction pressure plus 3 MPa under automatic control. Then, the gas is depressurized to about the reaction pressure plus 0.5 MPa at valve 135. This reducing valve 135 is a outlet pressure control valve. The outlet pressure control valve may be a spring type or a pneumatically controlled valve having pressure sensor 137 as shown in FIG. 1. In either type, the inlet side of valve 139 is preferably always kept at a constant pressure. A predetermined amount of the gas kept at a constant pressure in line 136 is injected into the reactor under the action of flow control valve 139. The sensor of flow controller 138 may be an orifice type or a mass flow controller. In the present invention, the flow control system is not specifically limited, but preferably adapted to inject a constant flow into the reactor. If a constant flow is not injected into the reactor, an oxidizer may lack or undegraded reducing substances may be discharged from the reactor. When an oxidizer lacks in the hydrothermal electrolytic reactor, hydrogen emission from the inner wall of the reactor body serving as a cathode may be activated to form an explosive gas. Thus, it is important to inject the oxidizer air at a controlled flow rate into the reactor. In order to measure this flow rate, it is important to always keep a constant pressure in line 136 including flow controller 138. The gas having passed through the flow control valve is preheated in heat exchanger 141 and injected into mixing nozzle 125.

The flow and reaction of the gas, air and aqueous medium in the hydrothermal electrolytic reactor are similar to those explained above with reference to FIG. 1. If the gas flow rate is 50 NL/min or more in the apparatus according to the embodiment shown in FIG. 2, void ratio increases between the electrodes, resulting in an increase in electric resistance between the electrodes and involving a remarkably high voltage for applying a predetermined current. Therefore, the apparatus according to the embodiment shown in FIG. 2 is economic when the flow rate of the influent gas is 50 NL/min or less. Considering that the aqueous medium serves as a reaction medium and the elementary halogen ion serves as a catalyst, the substantial consumption of the aqueous medium is very small. Water rather tends to increase in the reactor because oxidation reaction of reducing substances produces water and carbon dioxide gas or the like. Preferably, a small amount of the aqueous medium is extracted and a fresh aqueous medium is supplied to the reactor because the pH and other properties of the aqueous medium vary as reducing substances dissolve or electrolytic reaction proceeds. The aqueous medium is extracted via line 241 at the bottom of the reactor. The amount to be extracted is determined by liquid level controller 216. When the liquid level in the reactor rises, the liquid level controller activates valve 243 to the open direction to extract an appropriate amount of the aqueous medium from the reactor. Preferably, cooler 242 shown in FIG. 2 is provided upstream of valve 243 because direct contact of the high-temperature aqueous medium with valve 243 may cause leakage from the sealing part of the valve damaged by heat. The amount extracted is so small that cooler 242 may be an air cooler. The fresh aqueous medium is injected into the top of the reactor and combined with the aqueous medium coming up along the insertion electrode and reactor wall to flow to the downstream in insertion electrode 41. Therefore, the insertion electrode preferably has a cylindrical shape. Thus, a flow of the aqueous medium is formed in the reactor, which rises outside the electrode and drops inside the electrode. It is effective to provide stirring shaft 41 with bladed to further activate this flow. It is also effective to design impeller 39 to accelerate this dropping speed in the electrode.

The treated gas is discharged with air via line 220. This treated gas heated to high in temperature is cooled in heat exchangers 114 and 141. Thus cooled treated gas is injected into a gas-liquid separator via reducing valve 224. The reaction pressure prevails on the inlet side of reducing valve 224. Reducing valve 224 is controlled by pressure controller 223. Pressure controller 223 determines the reaction pressure. Normally, this pressure controller 223 is preferably set at a pressure value 0.01–5 MPa higher than the saturated vapor pressure at the reaction temperature. If the reactor is operated at a pressure less than 0.01 MPa higher than the saturated vapor pressure, a minor pressure variation in the reaction system causes the aqueous medium in reactor 40 to evaporate so that a large amount of water vapor enters into line 220 to invite dry running of the reactor or other disadvantages. Dry running causes deposition of reducing substances or salts or scaling on electrodes or other components in the reactor to impede stable continuous operation. However, a system design is required to keep an unnecessarily high pressure and the resulting system cost becomes high if the reactor is operated at a pressure 5 MPa or more higher than the saturated vapor pressure.

The gas injected into the gas-liquid separator is passed through a demister, and discharged to the atmosphere via pressure control valve 231. The treated gas discharged via line 220 is preferably passed through a demister to remove water, because it contains a small amount of water vapor in equilibrium with the reaction temperature. The gas-liquid separator is preferably adjusted at a pressure range of 0.001 MPa–1 MPa higher than normal pressure with pressure controller 230. Condensed water or the aqueous medium extracted via line 241 is discharged from the gas-liquid separator by a liquid level controller and removed via valve 228. The gas-liquid separator is preferably slightly pressurized to smoothly extract the aqueous medium because some pressure loss occurs at valve 228. The treated gas having passed through valve 231 enters into oxygen level controller 232, which reads the oxygen level to control the setting value of air flow controller 138. Here, the oxygen level controller is preferably set at an oxygen level of 0.01 vol % or more. If the oxygen level of the treated gas is low, hydrogen generation in the hydrothermal electrolytic reactor remarkably increases. That is, the oxygen atom of water is used to facilitate the oxidative degradation reaction in the hydrothermal electrolytic reaction when substantially no external oxidizer exists. Therefore, extra hydrogen atom of water is emitted as hydrogen gas. It is necessary to sufficiently supply oxygen to the hydrothermal electrolytic reaction site in order to inhibit this hydrogen gas emission. It is effective to determine the amount of the oxidizer to be supplied to the hydrothermal electrolytic reactor by monitoring the oxygen level of the depressurized and cooled treated gas as in the present invention, because it is difficult to measure the oxygen content of the hydrothermal electrolytic reactor at high temperature and high pressure. Needless to say, air flow controller 138 is automatically activated to the direction for blocking air inflow when the gas already contains an oxidizer such as oxygen for oxidatively degrading reducing substances.

As has been described above, a gas containing reducing substances can be stably and continuously treated in a highly automated apparatus according to the present invention.

Another embodiment of the present invention is explained with reference to FIG. 3. The apparatus shown in FIG. 3 is especially effective for treating a large amount of gas. Specifically, it is especially effective for treating a gas at a flow rate of 50 L/min or more.

The mechanisms for introducing and controlling the aqueous medium, air and gas are similar to those of the embodiment shown in FIG. 2. However, the mechanism for heating the introduced gas and air and the mechanism in the hydrothermal electrolytic reactor are different. When a large amount of gas is to be treated, gas and air are insufficiently heated with a heat exchanger alone. Especially when the reactor is heated with heater 206 alone at start-up, a long time is required to reach the reaction temperature, In the apparatus according to the embodiment shown in FIG. 3, therefore, the influent gas and the oxidizer air are warmed via heat exchangers 114 and 141, and then heated in heater 117 and 143, respectively. Preferably, each line is coiled (115, 142) through the heater to increase the heating efficiency. The temperature in the heater and the temperature of the heated material at the exit of the heater are desirably measured by temperature sensors 120/121 and 147/148 to control heating the influent gas and the oxidizer air are desirably heated to a predetermined reaction temperature in the hydrothermal electrolytic reactor. In the present invention, the heater is not limited to an electric heater, but may also be an existing fluid heating system such as an oil burner heating system or a thermal fluid heating system.

Next, the behavior of the aqueous medium, gas and air and the prevailing degradative reaction process in the reactor are explained. At first, the heated gas and air are injected into reactor 202 via mixing nozzle 125. In the present invention, the mixing nozzle is not limited to a specific shape but preferably has a shape that improves the mixing state between air and the gas as well as possible to generate fine bubbles. Bubbles of the gas and air injected from nozzle 125 rise inside insertion electrode 204 by buoyancy in aqueous medium 47 in reactor 202. In the present embodiment, insertion electrode 204 has a cylindrical shape. During this rising process, reducing substances contained in the gas are absorbed from the gas into the aqueous medium. The absorption mechanism of this aqueous medium is explained by an increase of the solubility of reducing substances in a hydrothermal atmosphere. The dielectric constant of water at high temperature and high pressure decreases with increasing temperature. That is, even substances having a low solubility for water at normal temperature and normal pressure will be partially dissolved. When the gas is acidic, the absorption is further increased if the aqueous medium is basic. When the gas is basic, however, the absorption is further increased if the aqueous medium is acidic. Thus, it is important for the reactor shown in this FIG. 3 to transfer reducing substances contained in the gas to the aqueous medium. In order to improve absorption, it is also effective to charge a filler 205 of an insulating material in cylindrical insertion electrode 204 to help contact of the gas and air with the aqueous medium. Suitable insulating materials of this filler include ceramic materials such as silica, silica alumina, zirconia, alumina, monocrystalline alumina, titania. Suitable shapes of this filler are sphere, cylinder, Raschig ring, etc. This improves the contact efficiency of the aqueous medium with the gas and air to increase dissolution of reducing substances contained in the gas and air into the aqueous medium. The reducing substances in the gas absorbed to the aqueous medium rise in the insertion electrode and then drops with the flow of the aqueous medium outside the insertion electrode. A part of the gas and air deprived of reducing substances rises directly by buoyancy and exits the reactor via line 220. On the other hand, reducing substances contained in the aqueous medium are mineralized into harmless components by hydrothermal electrolytic oxidation prevailing between the inner wall of reactor 202 serving as a cathode and insertion electrode 204 during the dropping process. In the reaction site where electrochemical reaction proceeds, basically no bubbles exist so that the voltage applied across the electrodes can be reduced.

In the present invention, a strong acid ion can be used in place of or in combination with the halide ion incorporated into the aqueous medium. Thus, another aspect of the present invention provides a process for treating a gas containing reducing substances by hydrothermal electrolysis, comprising supplying said gas containing reducing substances into a reactor charged with an aqueous medium containing a strong acid ion under application of a direct current into said reactor at a temperature of 100° C. or more but not more than the critical temperature of said aqueous medium and at a pressure that allows said aqueous medium to be kept in the liquid phase.

The strong acid ion used for this purpose is preferably an ion corresponding to a strong acid having a dissociation constant (pK) of 3.5 or less at 25° C., more preferably an ion corresponding to a strong acid having a dissociation constant of 2.5 or less at 25° C. The acid corresponding to the strong acid ion is preferably protic.

The strong acid ion may be an inorganic acid ion or an organic acid ion. However, the strong acid is preferably an inorganic acid ion because organic acid ions may be degraded as hydrothermal electrolysis proceeds.

Suitable inorganic strong acid ions include, for example, halide ions, sulfate ion ($SO_4^{2-}$), nitrate ion ($NO_3^-$), phosphate ion ($PO_4^{3-}$). Suitable organic strong acid ions include, for example, trifluoroacetate ion ($CF_3COO^-$).

The strong acid ion may exist as an acid or a salt. When it exists as a salt, the salt may be formed with an inorganic cation such as an alkali metal ion or alkali earth metal ion or an organic cation.

In the process and apparatus for treating a gas by hydrothermal electrolysis according to the present invention, the throughput and process efficiency of the hydrothermal electrolytic reactor can be greatly improved by incorporating electrically conductive particles into the aqueous reaction medium to substantially increase the electrode surface area in the hydrothermal electrolytic reactor.

The incorporation of electrically conductive particles into the aqueous medium means that the aqueous medium containing water and electrically conductive particles is located between the original cathode and the original anode in the hydrothermal electrolytic reactor. When a dc voltage is applied across the original cathode and the original anode, individual conductive particles serve as an anode at the surfaces facing the original cathode and as a cathode at the surfaces facing the original anode under the effect of an electric field. Therefore, a current flows locally between the original cathode and the surfaces of individual conductive particles serving as an anode, and also a current flows locally between the original anode and the surfaces of conductive particles serving as a cathode. When two conductive particles are located in proximity to but without contact with each other and the cathodic surface of one conductive particle faces the anodic surface of the other conductive particle, for example, a current flows locally between the cathodic surface and the anodic surface. This also applies to more than two discrete conductive particles, in which case a current seems to flow between the cathodic surface of a conductive particle and the anodic surface of another conductive particle.

Thus, the current flowing between the original anode and the original cathode increases and the voltage across the original anode and the original cathode also increases when conductive particles exist in the aqueous medium as compared with when no conductive particles exist in the aqueous medium. Therefore, a large amount of electric power can be supplied to the aqueous medium to greatly improve the throughput and process efficiency of the hydrothermal electrolytic apparatus without increasing the surface area of the original anode and the original cathode.

For incorporating conductive particles into the aqueous medium, the hydrothermal electrolytic apparatus shown in FIG. 2 may be provided with a feeder not shown for supplying a controlled amount of conductive particles into aqueous medium conditioning tank 167, for example. In this case, a particle separator not shown such as a cyclone is preferably provided in aqueous medium eduction line 241 to recover conductive particles contained in the extracted aqueous medium. The recovered conductive particles can be recycled to aqueous medium conditioning tank 167.

Conductive particles used for this purpose may be wholly formed of a conductive material. Alternatively, they may be particles of a conductive material coated with another conductive material on their surfaces or particles of a non-conductive material coated with a conductive material on their surfaces. Even particles having an insulating oxide or the like deposited on their surfaces by corrosion or other reasons are regarded as conductive particles so far as they are generally conductive.

Particles formed of a conductive material include, for example, carbon particles, metal particles and conductive oxide particles. Carbon particles include, for example, particles of graphite. Metal particles include, for example, so-called metal powders such as iron powder, copper powder, silver powder, nickel powder, cobalt powder and aluminium powder. Conductive oxide particles include particles of a ferrite and ruthenium oxide. In terms of costs, iron powder and aluminium powder are preferred. Iron powder includes powdered scrap from machining of steel (including stainless steel), cast iron or the like.

Particles of a conductive material coated with another conductive material include metal particles coated with a thin film of another metal on their surfaces such as copper particles coated with platinum on their surfaces.

Particles of a non-conductive material coated with a conductive material on their surfaces include particles of an oxide powder coated with a metal thin film on their surfaces such as aluminium oxide particles coated with copper on their surfaces.

Particles of a conductive or non-conductive oxide powder coated with a conductive oxide on their surfaces are also suitable, such as zirconium oxide particles coated with iridium oxide on their surfaces and silicon dioxide particles coated with ruthenium oxide on their surfaces.

Synthetic polymer particles coated with a metal or a conductive oxide on their surfaces are also suitable, such as polymer particles of polyethylene glycol coated with ruthenium oxide on their surfaces.

Means for coating a metal thin film include electroplating, electroless plating, sputtering, physical vapor deposition, chemical vapor deposition, etc. Means for coating a conductive oxide thin film include calcination, sputtering, physical vapor deposition, chemical vapor deposition, etc.

These conductive particles are subjected to a current in the presence of a strong acid ion such as a halide ion at high temperature and high pressure. Suitable conductive particles may be irreversible particles liable to be molten or corroded under these conditions.or reusable chemically stable particles. For single use, iron powder, aluminium powder or the like are preferred in terms of costs. Reusable conductive particles preferably have such an excellent corrosion resistance that they remain unmolten even if a current is applied.

Reusable conductive particles are preferably formed of or coated with a conductive material having ruthenium, iridium, platinum, palladium, rhodium, copper, nickel, tin or an oxide thereof or a ferrite.

Ruthenium, iridium, platinum, palladium, rhodium, copper, nickel and tin may be elementary metals or oxides. Alloys of these metals are also preferably used. Such alloys include, for example, platinum-iridium, ruthenium-tin and ruthenium-titanium. In some embodiments, conductive materials based on palladium, ruthenium or an alloy of platinum and iridium are especially preferred.

Conductive particles may be in any form such as, but not limited to, sphere, rod, disk, T-shape, donut, tube, fiber, etc. Hollow particles are also suitable.

Conductive particles preferably have a size shorter than the distance between the anode and the cathode. The average size of conductive particles is preferably 1 cm or less, more preferably 5 mm or less, still more preferably 1 mm or less, most preferably 0.5 mm or less. For example, the size of spherical conductive particles means their diameter. The size of rod-like or tubular conductive particles means their length. The size of conductive particles may be homogeneous or may widely vary.

Rod-like or tubular conductive particles preferably have an aspect ratio, ie, the ratio of the length to the diameter of the rod or tube of 0.1–1000, more preferably 0.5–100.

The aqueous medium preferably contains 0.01% by weight or more of conductive particles, more preferably 0.1% by weight or more of conductive particles. The presence of conductive particles in an amount even as small as 0.01% by weight in the influent increases a current, therefore a voltage across the original electrodes.

The aqueous medium preferably contains 30% by weight or less of conductive particles, more preferably 10% by weight or less of conductive particles. If more than 30% by weight of conductive particles are contained, the fluidity of the influent is affected and the probability of a short circuit between electrodes significantly increases.

The content of conductive particles in the influent means the content in the feed line for supplying the influent into the reaction cell. This is because conductive particles are not always uniformly distributed in the reaction cell so that the content is difficult to exactly determine. When the reaction cell is tubular and the influent is transferred from the bottom to the top, for example, the concentration of conductive particles tends to be higher at the bottom of the reaction cell.

The hydrothermal electrolytic reactor shown in FIG. 2 was used to treat a mixed gas containing 50 ppm hydrogen sulfide and 50 ppm methyl mercaptan (nitrogen balance). The flow rate of the mixed gas was 0.5 L/min, and the flow rate of the oxidizer air was also 0.5 L/min. The aqueous medium used was a 0.5 wt % aqueous NaCl solution. The aqueous medium was adjusted to pH 10 with NaOH. The inflow rate of the aqueous medium was set at 1 mL/min. The reactor temperature was set at 250° C. and the reaction pressure was set at 7 MPa. After the reaction temperature and the reaction pressure reached predetermined values, a 12 A dc source was applied across the reactor and the insertion electrode. The reactor body served as a cathode and the insertion electrode served as an anode. Both hydrogen sulfide and methyl mercaptan levels measured with a detector tube at steady state were 1 ppm or less and odorless.

The following example illustrates the present invention without, however, limiting the present invention thereto.

EXAMPLE 1

The hydrothermal electrolytic reactor shown in FIG. 2 was used to treat a mixed gas containing 50 ppm hydrogen sulfide and 50 ppm methyl mercaptan (nitrogen balance). The flow rate of the mixed gas was 0.5 L/min, and the flow rate of the oxidizer air was also 0.5 L/min. The aqueous medium used was a 0.5 wt % aqueous NaCl solution. The aqueous medium was adjusted to pH 10 with NaOH. The inflow rate of the aqueous medium was set at 1 mL/min. The reactor temperature was set at 250° C. and the reaction pressure was set at 7 MPa. After the reaction temperature and the reaction pressure reached predetermined values, a 12 A dc source was applied across the reactor and the insertion electrode. The reactor body served as a cathode and the insertion electrode served as an anode. Both hydrogen sulfide and methyl mercaptan levels measured with a detector tube at steady state were 1 ppm or less and odorless.

INDUSTRIAL APPLICABILITY

According to the present invention, processes and apparatus capable of treating a gas containing various reducing substances to efficiently degrade the reducing substances are provided. Processes and apparatus according to the present invention can be applied to the treatment of reducing substances contained in a liquid medium by transferring the reducing substances contained in the liquid medium to a gas and treating said gas as an influent gas.

What is claimed is:

1. A process for treating a gas containing reducing substances by hydrothermal electrolysis, comprising supplying an influent gas containing reducing substances into a reactor charged with an aqueous medium containing a halide ion under application of a direct current at a temperature of 100° C. or more but not more than the critical temperature of said aqueous medium and at a pressure that allows said aqueous medium to be kept in the liquid phase.

2. The process of claim 1 wherein the influent gas contains an organic halide.

3. The process of claim 1 further comprising the step of adding an oxidizer to said aqueous medium.

4. The process of claim 3 wherein oxygen in the influent gas is used as said oxidizer.

5. The process of claim 3 wherein air is added to the reaction system as said oxidizer.

6. The process of claim 1 further comprising the step of adding an alkali to said aqueous medium when said influent gas containing reducing substances is acidic.

7. The process of claim 1 further comprising the step of adding an acid to said aqueous medium when said influent gas containing reducing substances is basic.

8. A process for treating reducing substances contained in a liquid medium comprising transferring reducing substances contained in a liquid medium to a gas and supplying said gas as an influent gas to treat said gas by the process of claim 1.

9. The process of claim 1 further comprising the step of adding conductive particles into said aqueous medium.

10. The process of claim 9 further comprising the step of separating the conductive particles from said aqueous medium treated in the reactor.

11. A process for treating a gas containing reducing substances by hydrothermal electrolysis, comprising supplying a gas containing reducing substances into a reactor charged with an aqueous medium containing a strong acid ion under application of a direct current at a temperature of 100° C. or more but not more than the critical temperature of said aqueous medium and at a pressure that allows said aqueous medium to be kept in the liquid phase.

12. An apparatus for treating a gas containing reducing substances by hydrothermal electrolysis, comprising a reactor having an inlet for introducing a gas containing reducing substances and an outlet for discharging the gas treated and capable of resisting the pressure of hydrothermal reaction, and a pair of electrodes for performing electrolysis in said reactor.

13. The apparatus of claim 12 further comprising a heater for heating the reactor.

14. The apparatus of claim 12 further comprising an inlet for introducing an aqueous medium and an outlet for discharging the aqueous medium used.

15. The apparatus of claim 12 further comprising a means for introducing an oxidizer into the reactor.

16. The apparatus of claim 15 wherein the means for introducing an oxidizer is a nozzle for mixing it with an influent gas.

17. The apparatus of claim 15 further comprising a heating means for heating an oxidizer before it is introduced into the reactor.

18. The apparatus of claim 12 further comprising a heating means for heating an influent gas before it is introduced into the reactor.

19. The apparatus of claim 12 wherein the electrode has a cylindrical shape.

20. The apparatus of claim 19 wherein a filler is charged in the cylindrical electrode.

21. The apparatus of claim 20 wherein said filler is a ceramic material in the form of a sphere, cylinder or Raschig ring.

22. The apparatus of claim 12 comprising a feeder for supplying conductive particles into the aqueous medium.

23. The apparatus of claim 22 comprising a separator for separating conductive particles from the aqueous medium treated in the reactor.

24. The apparatus of claim 23 wherein said separator comprises a liquid cyclone.

25. The apparatus of claim 23 wherein said separator comprises a filter device.

* * * * *